United States Patent

Mondt et al.

[11] Patent Number: 5,246,130
[45] Date of Patent: Sep. 21, 1993

[54] FUEL STORAGE APPARATUS

[75] Inventors: James R. Mondt, Clarkston; Gerald L. Vaneman, Grand Ledge, both of Mich.

[73] Assignee: General Motors Corporation, Detroit, Mich.

[21] Appl. No.: 718,399

[22] Filed: Jun. 21, 1991

[51] Int. Cl.⁵ ............................................. B65D 25/02
[52] U.S. Cl. ................................. 220/88.2; 220/88.1
[58] Field of Search ............................. 220/88.1, 88.2

[56] References Cited

U.S. PATENT DOCUMENTS 2,372,545  3/1945  Breedlove .
3,018,019  1/1962  Gibbs, Jr. .................... 220/88.1
3,287,094  11/1966  Brownell ...................... 220/88.2
3,748,111  7/1973  Klose .
5,000,336  3/1991  Gass ............................. 220/88.2

FOREIGN PATENT DOCUMENTS 36591  3/1909  Fed. Rep. of Germany ..... 220/88.2

Primary Examiner—Allan N. Shoap
Assistant Examiner—S. Castellano
Attorney, Agent, or Firm—Charles K. Veenstra

[57] ABSTRACT

Coiled inserts formed from herringbone corrugated foil are disposed in the filler neck and vent lines of a methanol fuel tank to prevent passage of a flame into the tank.

6 Claims, 2 Drawing Sheets

FUEL STORAGE APPARATUS

TECHNICAL FIELD

This invention relates to apparatus particularly suited for storing methanol.

SUMMARY OF THE INVENTION

Methanol vapor is flammable under conditions where other fuel vapor is not. Accordingly, special apparatus is desired to prevent ignition of methanol vapor in a tank used to store methanol or a mixture of methanol and another fuel.

This invention provides inserts for the filler neck and vent lines of such a tank. The inserts prevent passage of a flame into the tank and thereby prevent ignition of methanol vapor in the tank.

The details as well as other features and advantages of a preferred embodiment of the inserts provided by this invention are set forth in the remainder of the specification and are shown in the accompanying drawings.

THE PREFERRED EMBODIMENT

Figure 1:
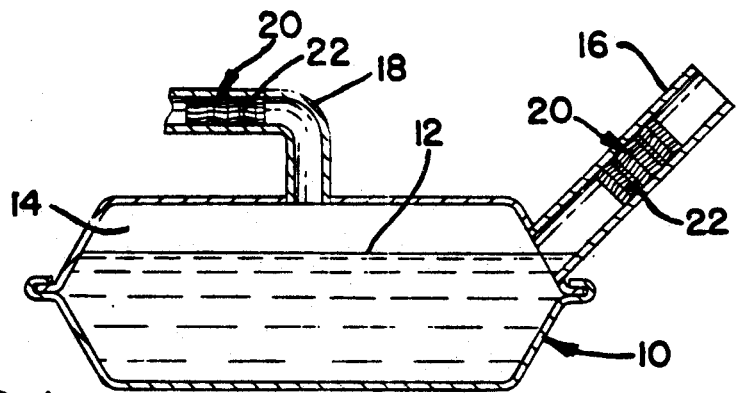
FIG. 1 is a schematic view of a fuel tank having filler neck and vent line inserts provided by this invention.
Figure 2:
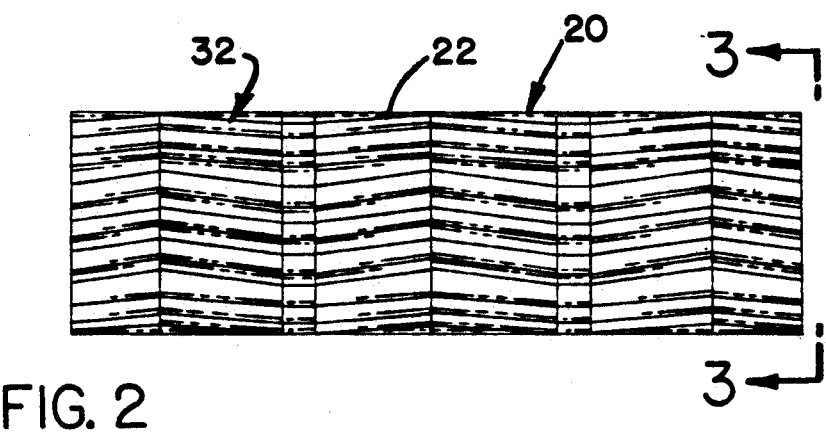
FIG. 2 is an enlarged side view of one of the FIG. 1 inserts.
Figure 3:
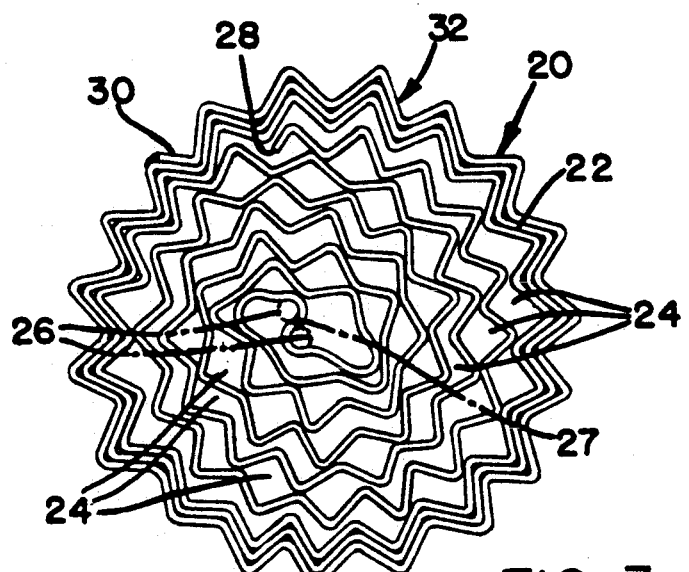
FIG. 3 is an end view of the FIG. 2 insert, taken along line 3—3 of FIG. 2 and further enlarged to show details of construction.

Referring to the drawings, a tank 10 contains a quantity of liquid fuel 12. Within tank 10, a vapor space 14 above the liquid fuel 12 contains a mixture of fuel vapor and air.

Fuel tank 10 has a filler neck 16 for introducing liquid fuel to the tank. As liquid fuel enters the tank, a portion of the mixture of fuel vapor and air is displaced from vapor space 14 out through filler neck 16.

In addition, a portion of the mixture of fuel vapor and air is expelled from vapor space 14 out through a fuel tank vent line 18 as the tank is heated or filled. Air enters the tank through vent line 18 as the tank is cooled or emptied.

Inserts 20 are located in both filler neck 16 and vent line 18. Inserts 20 have diameters that completely fill filler neck 16 and vent line 18.

Each insert 20 is formed from a strip of foil 22 that has been corrugated in a herringbone pattern. The foil 22 is coiled, folded or stacked to provide a plurality of interconnected tortuous passages or cells 24 through which the mixture of fuel vapor and air must pass as it is displaced or expelled from tank 10. The corrugations are such that the finished insert 20 has a density of between about 200 and about 300 passages per square inch (between about 31 and about 47 passages per square centimeter).

The use of herringbone corrugated foil 22 allows cross-flow of fluid in and between passages 24, providing a uniform velocity distribution within insert 20 so all of the surface area of foil 22 is available to contact the fluid passing through insert 20, while minimizing the amount of foil material and thus the flow restriction of insert 20. The herringbone corrugated foil 22 thereby provides extensive heat transfer capability without unduly increasing the flow restriction in filler neck 16 or vent line 18. Inserts 20 accordingly are effective to divide and quench any flame attempting to propagate through filler neck 16 or vent line 18 into tank 10, without unduly inhibiting flow through either filler neck 16 or vent line 18.

In the embodiment shown here, foil 22 is a methanol resistant type 304 stainless steel (annealed) about 51 millimeters wide by about 0.05 millimeter thick. The herringbone corrugations are formed by convex and concave creases that follow a zig-zag pattern across the width of foil 22. For a density of about 225 passages or cells per square inch (about 35 passages or cells per square centimeter), the herringbone corrugations are formed by creases spaced about 2.6 millimeters apart and with a depth of about 1.2 millimeters, and each crease changes direction by an included angle of about 158 degrees about every 8 millimeters along each crease. As another example, for a density of about 280 passages or cells per square inch (about 43 passages or cells per square centimeter), the herringbone corrugations are formed by creases spaced about 2.3 millimeters apart and with a depth of about 1.0 millimeter, and each crease changes direction by an included angle of about 158 degrees about every 7 millimeters along each crease.

Figure 4A:
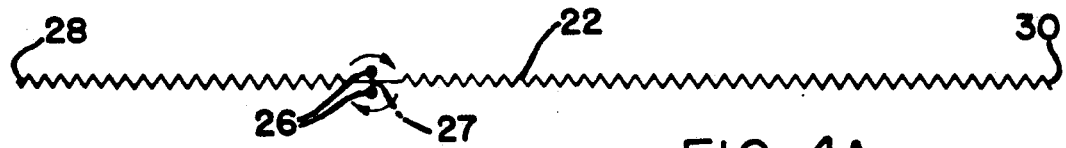
FIGS. 4A through 4E represent certain steps in one method for manufacture of the FIG. 1 inserts.
Figure 4B:
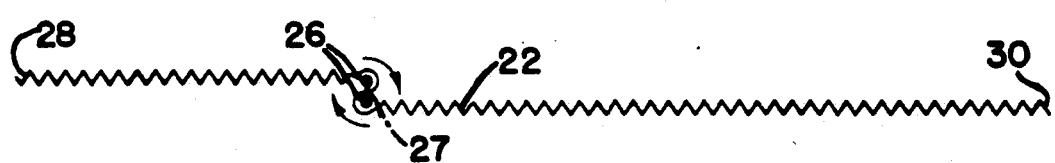
Figure 4C:
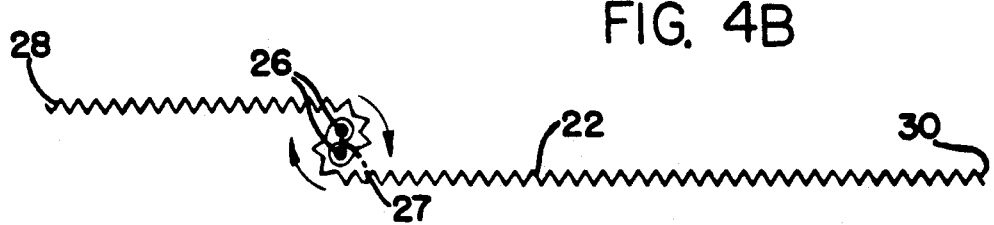
Figure 4D:
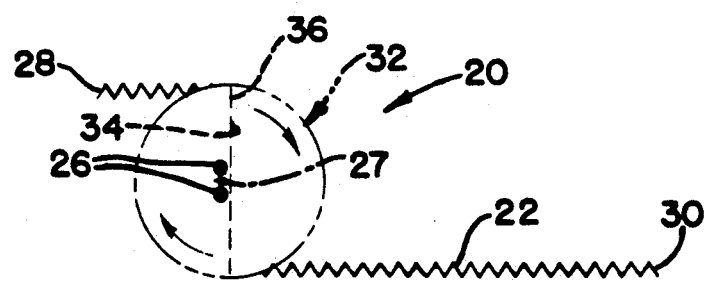
Figure 4E:
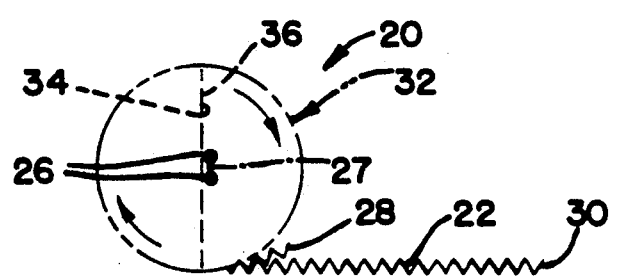

As shown in FIG. 4, foil 22 is held in tension and coiled by a set of winding pins 26. Winding pins 26 embrace foil 22 at a flattened winding axis 27 nearer one end 28 of foil 22 than the other end 30, and foil 22 is wound about pins 26 until end 28 approaches or engages the coil 32. The distance from flattened axis 27 to end 28 is carefully measured because that distance establishes the diameter of finished insert 20.

If necessary to reinforce insert 20 against axial or telescopic displacement of the individual wraps within coil 32, a hole 34 may be drilled approximately diametrally through coil 32 at about the mid-point of winding axis 27, and a through pin 36 inserted into hole 34. In the embodiment shown here, through pin 36 is type 304 weld wire about 1.6 millimeters diameter, and hole 34 is about 1.45 millimeters diameter. The resulting interference fit of through pin 36 in hole 34 holds through pin 36 in place during subsequent operations.

Following insertion of through pin 36, the remaining foil 22 is wrapped about coil 32 and secured by a number of tack welds across the end 30 of foil 22, and perhaps at other locations around coil 32, to prevent unwinding of coil 32.

By winding coil 32 about an axis 27 between the ends of a single length of foil 22, the inner layers of coil 32 do not nest with one another, and formation of interconnected passages 24 is assured. However, end 30 is sufficiently longer than end 28 to provide one or more nested single-layer wraps about coil 32 after end 28 engages coil 32; these nested layers assure retention of through pin 36 and add rigidity to the outer surface of coil 32.

Full length winding pins 26 of about 1.6 millimeters diameter are generally used to wind coil 32, but winding pins 26 of about 1.9 millimeters diameter also have been used. Alternatively, two short winding pins 26, each formed by a slot in the end of a rod and embracing the length of foil 22 from opposite edges, may be preferred. After coil 32 is wound and end 30 tack welded, winding pins 26 are removed.

The winding axis 27 is usually flattened only the width of one corrugation, and the spacing between winding pins 26 is only large enough to embrace the flattened portion of foil 22.

The insert 20 disposed in filler neck 16 experiences substantial axial loads from the flow of liquid fuel during filling of tank 10 and thus may require reinforcement against axial or telescopic displacement of the individual wraps. On the other hand, the insert 20 disposed in vent line 18 experiences very little axial load and probably will not require such reinforcement.

Instead of drilling hole 34 for insertion of through pin 36 to provide reinforcement, a through pin 36 may be inserted by a power nail driver. As another alternative, insert 20 may be reinforced against axial or telescopic displacement of the individual wraps by periodically welding a wrap to a prior wrap as coil 32 is wound.

From the foregoing, it may be understood that this invention provides inserts that are effective to prevent propagation of flame through a fuel tank filler neck and vent line without unduly inhibiting the fuel tank filling and venting functions.

We claim:

1. An insert for use in the filler neck or vent line of a fuel tank, the insert comprising herringbone corrugated foil formed to provide a plurality of tortuous passages through which fuel vapor must pass as it is displaced or expelled from the tank, said passages having a density of between about 200 and about 300 passages per square inch, whereby the insert is effective to prevent propagation of flame therethrough without unduly inhibiting flow therethrough.

2. An insert for use in the filler neck or vent line of a fuel tank, the insert comprising herringbone corrugated foil coiled to provide a plurality of tortuous passages through which fuel vapor must pass as it is displaced or expelled from the tank, said passages having a density of between about 200 and about 300 passages per square inch, whereby the insert is effective to prevent propagation of flame therethrough without unduly inhibiting flow therethrough.

3. An insert for use in the filler neck or vent line of a fuel tank, the insert comprising herringbone corrugated foil coiled to provide a plurality of tortuous passages through which fuel vapor must pass as it is displaced or expelled from the tank, whereby the insert is effective to prevent propagation of flame therethrough unduly inhibiting flow therethrough, and wherein the insert further comprises a through pin inserted approximately diametrally therethrough to prevent telescopic displacement of the foil.

4. An insert for use in the filler neck or vent line of a fuel tank the insert comprising a single length of herringbone corrugated foil coiled to provide a plurality of tortuous passages through which fuel vapor must pass as it is displaced or expelled from the tank, whereby the insert is effective to prevent propagation of flame therethrough without unduly inhibiting flow therethrough, and wherein the insert is coiled about an axis between the ends of the length of the foil whereby at least the inner layers of the foil do not nest with each other.

5. An insert for use in the filler neck or vent line of a fuel tank, the insert comprising a length of herringbone corrugated foil coiled to provide a plurality of tortuous passages through which fuel vapor must pass as it is displaced or expelled from the tank, whereby the insert is effective to prevent propagation of flame therethrough without unduly inhibiting flow therethrough, an wherein the insert is coiled about an axis offset from the midpoint of the length of the foil whereby the outer layers of the foil nest with each other.

6. An insert for use in the filler neck or vent line of a fuel tank, the insert comprising a single length of herringbone corrugated foil coiled to provide a plurality of tortuous cells through which fuel vapor must pass as it is displaced or expelled from the tank, whereby the insert is effective to prevent propagation of flame therethrough without unduly inhibiting flow therethrough, wherein the insert further comprises a through pin inserted approximately diametrally therethrough to prevent telescopic displacement of the foil, wherein the insert is coiled about an axis offset from the midpoint of the length of the foil whereby the inner layers of the foil do not nest with each other while the outer layers of the foil do nest with each other, and wherein such outer layers also overlie and retain the through pin.

* * * * *